Patented Sept. 5, 1950

2,521,494

UNITED STATES PATENT OFFICE 2,521,494

METHOD OF MAKING LOWER POLYMERS OF ALKENYL AROMATIC COMPOUNDS

Glenn C. Wiggins, Midland, Mich., assignor to The Dow Chemical Company, Midland, Mich., a corporation of Delaware No Drawing. Application April 2, 1947, Serial No. 738,918

9 Claims. (Cl. 260—669)

This invention concerns an improved method, involving what is believed to be a new chemical reaction, for making lower polymers, particularly dimers and trimers, of alkenyl aromatic compounds having the general formula:

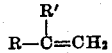

wherein R represents a monovalent aromatic radical having said valence on a nuclear carbon atom thereof and R' represents hydrogen or an alkyl radical containing less than four carbon atoms. The invention pertains especially to the production of dimers of nuclear substituted styrenes containing less than four nuclear substituents, which substituents are members of a group consisting of halogen atoms and alkyl radicals.

According to the invention, dimers and trimers of the above-mentioned alkenyl aromatic compounds are produced from corresponding alpha-haloalkyl aromatic compounds, alone or in admixture with such alkenyl aromatic compound, or from a mixture containing starting materials readily reactive to form the alpha-haloalkyl aromatic compound in situ as a chemical intermediate. In the latter instance, the components of the starting mixture reactive to form the alpha-haloalkyl aromatic compound in situ are hereinafter referred to generically as "source-materials" for the alpha-haloalkyl aromatic compounds.

It is known that dimers and trimers of styrene may be formed either by polymerizing monomeric styrene, or by depolymerizing higher molecular weight solid polymers of styrene, at very high temperatures, e. g. at 300° C. and above. However, these methods are inconvenient and usually result in formation of the dimers and trimers in undesirably low yield and together with a considerable amount of higher polymers of styrene. It is also known that acid-acting catalysts, such as sulphuric or hydrochloric acid, permit production of a mixture of lower polymers from styrene at temperatures below those required in the absence of the catalysts, but here again the mode of carrying out the reaction is inconvenient and the yield of dimers and trimers usually is poor.

It may be mentioned that various methods are known for dehydrohalogenating alpha-haloethylbenzenes to form monomeric styrene as the principal product. For instance, in U. S. Patent 1,687,903 styrene is formed by passing vapors of alpha-chloroethylbenzene through a reaction zone where they are heated at temperatures of from 500° to 725° C. In U. S. Patents 1,870,878 and 2,005,042 styrene is formed by heating alpha-chloroethylbenzene together with a small amount of a relatively non-volatile acid at temperatures between 100° and 200° C. under conditions such that styrene distills from the mixture as it is formed. The Patent 1,870,878 shows that heating of a mixture of alpha-chloroethylbenzene and a greater than catalytic amount of concentrated sulphuric acid at 100° C. without distillation of styrene from the mixture resulted in formation of a soft polymer similar to that usually obtained by the action of concentrated sulphuric acid on styrene.

I have discovered that dimers and trimers of the aforementioned alkenyl aromatic compounds may be produced in excellent yield by heating, at temperatures between 130° and 200° C. in the presence of certain metal-containing catalysts, an alpha-haloalkyl aromatic compound having the general formula:

wherein R represents a monovalent aromatic radical, preferably of the benzene series, R' represents hydrogen, or an alkyl radical such as a methyl, ethyl, propyl, or butyl radical, and X represents a halogen, preferably chlorine or bromine. Examples of such alpha-haloalkyl aromatic compounds are alpha-chloroethylbenzene, alpha-bromoethylbenzene, alpha-chloroisopropylbenzene, ar - chloro - alpha - chloroethylbenzene, ar - dichloro - alpha - chloroethylbenzene, ar - chloro - alpha - chloroisopropylbenzene, ar - dichloro - alpha - chloroisopropylbenzene, ar - bromo - alpha - bromoisopropylbenzene, alpha-chloroethyltoluene, alpha-chloroethylxylene, alpha-bromo-ethyltoluene, alpha-chloro-(sec.-butylbenzene), ar - chloro - alpha-chloroethyltoluene, and ar-chloro-alpha-chloroethylxylene, etc.

I have further found that source-materials capable of reacting to form an alpha-haloalkyl aromatic compound in situ may be used, in place of a preformed alpha-haloalkyl aromatic compound, as starting material for the production of dimers and trimers of alkenyl aromatic compounds in accordance with the invention. The source-materials which may be employed comprise: (1) mixtures of a hydrogen halide, or a hydrohalic acid, with an ether of an alpha-hydroxyalkyl aromatic compound corresponding to the alpha-haloalkyl aromatic compound to be formed as a chemical intermediate, and (2) mixtures of a hydrogen halide, or a hydrohalic acid, with an alkenyl aromatic hydrocarbon having the general formula hereinbefore given and having at least nine carbon atoms in the molecule. Examples of the first of these classes of source-materials are mixtures of hydrogen chloride, hydrogen bromide, or a corresponding hydrohalic acid with: an ether of alpha-phenylethyl alcohol, an ether of alpha-hydroxyethyl-chlorobenzene, an ether of an alpha-hydroxyethyl-dichlorobenzene, an ether of an alpha-hydroxyisopropyl-chlorobenzene, an ether of an alpha-hydroxyethyl-toluene, an ether of an alpha-hydroxyethyl-xylene, an ether of an alpha-hydroxyisopropyl-toluene, an ether of an alpha-hydrovyisopropyl-xylene, or a mixed ether of any two such alcohols, etc. Examples of the second of the above classes of source-materials are mixtures of hydrogen chloride, hydrogen bromide, or a corresponding hydrohalic acid with alpha-methylstyrene, or with one or more nuclear alkylated alkenyl aromatic compounds such as vinyltoluene, vinylxylene, ethyl-vinylbenzene, or isopropenylbenzene, etc.

It should be mentioned that a mixture of hydrogen chloride, or hydrochloric acid, with styrene or a nuclear chlorinated styrene is not satisfactory for the production of corresponding dimers and trimers in high yield by the present method, due apparently to direct polymerization of a large proportion of these particular alkenyl aromatic compounds to form polymers higher than the dimers and trimers which are desired. In other words, it is necessary that the alkenyl aromatic component of the second of the above-mentioned classes of source-materials be a hydrocarbon having at least nine carbon atoms in the molecule.

Examples of mixtures of an alpha-haloalkyl aromatic compound and an alkenyl aromatic compound which may be employed in practice of the invention are a mixture of styrene and alpha-chloroethylbenzene, a mixture of styrene and alpha-chloroisopropylbenzene, a mixture of alpha-methylstyrene and alpha-chloroethylbenzene, a mixture of alpha-chloroethyltoluene and vinyl-toluene (i. e. ar-methyl-styrene), a mixture of styrene and alpha-chloroethyl-toluene, a mixture of vinyl-chlorobenzene and alpha-chloroethyl-toluene, a mixture of vinyl-dichlorobenzene and alpha-chloroethyl-dichlorobenzene, etc. In certain of these instances it will be evident that mixed polymers, e. g. of styrene and alpha-methylstyrene, are necessarily formed. In place of the alpha-haloalkyl aromatic components of the starting mixtures just mentioned, any of the aforementioned source-materials satisfactory for formation of an alpha-haloalkyl aromatic compound in situ may be employed.

Examples of metal-containing catalysts which may be used in the reaction for production of the dimers and trimers in high yield are iron, magnesium, and the halides of these metals such as ferrous chloride, ferric chloride, ferrous bromide, ferric bromide, ferric iodide, magnesium bromide and magnesium chloride, etc. Iron, or a halide thereof, is preferred as a catalyst. When employing metallic iron or metallic magnesium in the reaction, it is probable that a portion thereof reacts to form a corresponding metal halide and that the latter is the catalyst for the reaction for formation of the dimers and trimers of alkenyl aromatic compounds.

When employing such catalysts for the production of dimers and trimers of alkenyl aromatic compounds from mixtures of a hydrogen halide, or an alpha-haloalkyl aromatic compound, and an alkenyl aromatic hydrocarbon having at least nine carbon atoms in the molecule, the proportion of halogen present, e. g. chemically combined in the hydrogen halide or in the alpha-haloalkyl aromatic compound, may be as small as 0.1 gram atom of halogen or less per mole of aromatic compounds in the mixture of starting materials. In such instance, it appears that a considerable amount of hydrogen halide is repeatedly consumed and regenerated in the reaction so that one atomic weight of halogen, chemically combined in either of the above-mentioned halogen-containing starting materials, is sufficient for production of several molecular weights of the dimers and trimers. The starting mixtures just mentioned may, of course, contain more than 0.1 gram atomic weight of the chemically combined halogen per gram mole of aromatic compounds.

However, when producing the dimers and trimers from a mixture of a hydrogen halide, or an alpha-haloalkyl aromatic compound, with an alkenyl aromatic compound, such as styrene or a nuclear chlorinated styrene, having only eight carbon atoms in the molecule, it is necessary that the mixture contain at least two-thirds molecular equivalent, and preferably one mole or more, of the alpha-haloalkyl aromatic compound per mole of the alkenyl aromatic compound, since a molecular excess of such alkenyl aromatic compounds does not readily react with a hydrogen halide to form an alpha-haloalkyl aromatic compound, but instead tends to polymerize directly with formation of polymers higher than the trimers.

I have further found that certain of the aforementioned starting materials, viz. the alpha-haloalkyl aromatic hydrocarbons having at least nine carbon atoms in the molecule, the source-materials for such alpha-haloalkyl aromatic hydrocarbons, and mixtures of at least 0.8, preferably one, molecular equivalent of such alpha-haloalkyl aromatic hydrocarbon, or source-materials for the same, with one molecular equivalent or less of any of the aforementioned alkenyl aromatic compounds may be reacted at temperatures between 130° and 250° C. in the absence of iron, magnesium, or a corresponding metal halide, to obtain high yields of dimers and trimers of corresponding alkenyl aromatic compounds. I have also found that the dimer formed in the absence of a metal-containing catalyst frequently differs from that formed under otherwise similar conditions in the presence of the catalyst. For instance, the dimer of alpha-methyl-styrene formed in the absence of a catalyst is a liquid compound or a mixture of the liquid together with a crystalline isomer, whereas the dimer formed in the presence of iron is a crystalline compound.

The foregoing general teachings concerning the invention may be illustrated as follows. When a compound such as alpha-chloroethylbenzene, alpha-chloroisopropylbenzene, alpha-chloroethyl-chlorobenzene, or alpha-chloroethyl-xylene is heated at reaction temperatures between 100° and 200° C. in the presence or absence of a catalyst such as iron, magnesium, or a halide of one of these metals, hydrogen chloride is evolved and dimers and trimers of the corresponding alkenyl aromatic compound are formed in high yield, the dimer usually being the principal product. Similar results are obtained when the reaction is carried out in the presence of such catalyst using, as the starting material a mixture of alpha-methylstyrene, vinyl-toluene, or vinyl-xylene with 0.1 of its molecular equivalent or more of hydrogen chloride, or of an alpha-haloalkyl aromatic compound such as alpha-chloroethylbenzene or alpha-chloroisopropylbenzene. However, when a mixture of an alkenyl aromatic hydrocarbon such as vinyl-toluene, and hydrogen chloride or an alpha-haloalkyl aromatic compound, e. g. alpha-chloroisopropylbenzene, is heated at reaction temperatures between 100° and 200° C., the desired dimers and trimers are obtained in high yield only when the starting mixture contains 0.4 molecular equivalent or more of the halogen-containing reactant per mole of the alkenyl aromatic compound. Otherwise, the reaction either stops short of completion or continues with formation of higher polymers in large amount.

From these facts it is evident that the high yields of dimer and trimer obtained in practice of the invention are due to occurrence of a reaction between an alkenyl aromatic compound and an alpha-haloalkyl aromatic compound to liberate hydrogen halide and form the dimer and trimer. When a catalyst such as iron is present and one of the starting materials is an alkenyl aromatic hydrocarbon such as alpha-methylstyrene or vinyl-toluene, a considerable part of the hydrogen chloride thus formed reacts with the alkenyl aromatic hydrocarbon to form an additional amount of the corresponding alpha-haloalkylaromatic hydrocarbon which is then available for further reaction to form the dimers and trimers. In the absence of a catalyst, reaction between the hydrogen halide and vinyl aromatic hydrocarbon appears to occur only to a slight extent and, instead, the vinyl aromatic compound polymerizes to form polymers higher than its trimer. When an alpha-haloalkyl aromatic compound is used alone as the starting material, a portion thereof apparently undergoes dehydrohalogenation with formation of a corresponding alkenyl aromatic hydrocarbon which immediately reacts with a further amount of the alpha-haloalkyl aromatic hydrocarbon to liberate a hydrogen halide and form a dimer or trimer.

Such reactions, using alpha-chloroethylbenzene, $C_8H_9Cl$, as the starting material may be illustrated by the equations:

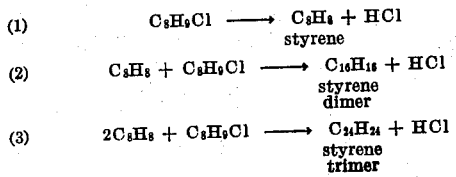

Equations 2 and 3 represent reactions of a type heretofore unknown for the formation of dimers and trimers of alkenyl aromatic compounds.

The reaction for production of the dimers and trimers may be carried out batchwise or in continuous manner, as desired. In batch operation the mixture is heated at reaction temperatures between 100° and 250° C., preferably between 130° and 200° C. until the evolution of a hydrogen halide, formed in the reaction, has substantially ceased. The reaction is usually carried out at atmospheric pressure or thereabout, but it may be conducted at lower or higher pressures with or without venting of a hydrogen halide from the material undergoing reaction. After the reaction, the desired products are usually separated by fractional distillation under vacuum. The mixture may be blown with air or treated with alkali to free it of dissolved hydrogen halide prior to the distillation, or it may, if desired, be distilled directly without such preliminary deacidification treatment.

In continuous practice, the reaction is carried out under the conditions just given, but the reactant, or reactants, are fed to a heated reaction zone while withdrawing reacted material from said zone for recovery of the products.

The following examples describe certain ways in which the principle of the invention has been applied, but are not to be construed as limiting its scope.

*Example 1*

In an attempt to esterify alpha-hydroxy-ethyl-xylene, the latter was heated at about 120° C. under reflux with a molecular excess of glacial acetic acid while passing hydrogen chloride into the mixture in amount exceeding the molecular equivalent of the alpha-hydroxy-ethyl-xylene. Thereafter, the mixture was fractionally distilled under vacuum. Little, if any, of the expected ester was obtained. Instead, the reaction products consisted almost entirely of about two parts by weight of a colorless liquid dimer of vinyl-xylene, which dimer distilled at about 170°–180° C. at 5 millimeters absolute pressure, and one part of a more viscous liquid trimer of vinyl-xylene. The trimer distilled at about 240°–250° C. at 6 millimeters absolute pressure.

*Example 2*

Alpha-chloroethylxylene was heated under reflux in a glass flask at temperatures of from 120° to 130° C. for 44 hours, during which period hydrogen chloride was evolved. Thereafter, the mixture was fractionally distilled to separate the products. It was found that approximately 75 per cent of the alpha-chloroethylxylene had been consumed. The reaction products consisted of 61.3 per cent by weight of the dimer of vinyl-xylene, 25.9 per cent of the trimer of vinyl-xylene, and 12.8 per cent of solid polymers of higher molecular weight.

In another experiment, a solution of vinyl-xylene in acetic acid was treated with a catalytic amount of hydrogen chloride and heated for 55 hours under reflux in a glass flask at temperatures which gradually rose from 120° to 192° C. as the vinyl-xylene became polymerized. The product was a solid gel of polymeric material composed principally of polymers higher than the trimer of vinyl-xylene.

From these experiments, it is evident that the high yields of dimer and trimer in the first experiment was due to employment of alpha-chloroethylxylene as a reactant, rather than to formation of vinyl-xylene in situ and direct polymerization of the vinyl-xylene.

*Example 3*

A mixture of 7 gram molecular equivalents of alpha-chloroisopropylbenzene and 5 gram moles of alpha-chloroethylbenzene was heated under reflux in a glass flask for 5 hours, the temperature of the mixture toward the end of this period being 200° C. Hydrogen chloride was evolved during heating of the mixture. Thereafter, the mixture was fractionally distilled to separate the products. It was found that approximately 92.4 per cent by weight of the starting materials had been consumed. Of the products, 43.5 per cent by weight consisted of liquid dimers and mixed dimers, e. g. a mixed dimer of one mole of styrene combined with one mole of alpha-methylstyrene, which liquid dimers distilled at 165°–180° C. at 6 millimeters absolute pressure, and 44.8 per cent consisted of the corresponding liquid trimers which distilled at 225°–250° C. at 6 millimeters absolute pressure. The remaining 11.7 per cent of the products were solid polymers of higher molecular weights.

*Example 4*

A mixture of equimolecular amounts of alpha-chloroethylbenzene and alpha-chloro-isopropylbenzene was heated under reflux in a glass vessel at a final temperature of about 180° C. for 16 hours. Hydrogen chloride was evolved during heating of the mixture. The mixture was thereafter fractionally distilled to separate the products. It was found that 92 per cent of the starting materials had been consumed. Of the reaction products, 45.6 per cent by weight consisted of dimeric material, largely a mixed dimer composed of one molecule of styrene and one molecule of alpha-methylstyrene, 43.5 per cent was liquid trimeric material and the remainder consisted of solid polymers of higher molecular weight.

Another experiment was carried out in similar manner, except that in this instance the starting material was an equimolecular mixture of alpha-methylstyrene and alpha-chloroethylbenzene and that the temperature at the close of the 16 hour period of heating was 200° C. The same kinds of reaction products were obtained as in the first experiment, the relative proportions thereof being 50.2 per cent by weight of dimers, 39 per cent of trimers, and about 10.8 per cent of higher polymers.

*Example 5*

A mixture of equal parts by weight of alpha-methylstyrene and alpha-chloroethyl-ethylbenzene was heated for 8 hours under reflux in a glass flask ultimately to a temperature of 200° C. Hydrogen chloride was evolved during heating of the mixture. Thereafter the mixture was distilled to separate the products. It was found that 90 per cent by weight of the starting materials had been consumed. The polymeric products, which comprised polymers and copolymers of alpha-methylstyrene and ethyl-vinylbenzene, were as follows: 40.7 per cent of liquid dimers, 44.3 per cent of liquid trimers, the remainder being higher polymers.

*Example 6*

Alpha-chloroisopropylbenzene was heated under reflux in a glass vessel for 24 hours at temperatures which were increased from 140° to 175° C. during this period. Hydrogen chloride was evolved during heating of the mixture. Thereafter the mixture was distilled to separate the products. It was found that 89.2 per cent of the alpha-chloroisopropylbenzene had been consumed. Of the reaction products, approximately 91 per cent was a mixture of liquid and crystalline dimers of alpha-methylstyrene, 8.4 per cent was a viscous liquid trimer of alpha-methylstyrene, and the remainder consisted of higher solid polymers.

*Example 7*

Alpha-bromoisopropylbenzene was heated for 16 hours in a glass flask at temperatures which were increased from 100° to 160° C. Hydrogen bromide was evolved during heating of the material. Thereafter, the reacted mixture was fractionally distilled. It was found that 69 per cent of the alpha-bromoisopropylbenzene was consumed. Of the products, 52 per cent consisted of a mixture of liquid and crystalline dimers of alpha-methylstyrene which dimers distilled at approximately 150° C. at 5 millimeters absolute pressure; 12.6 per cent was a viscous liquid trimer of alpha-methyl-styrene; and the remainder consisted of higher polymers.

*Example 8*

A molecular excess of gaseous hydrogen chloride was bubbled through alpha-methylstyrene while heating the latter under reflux in a glass vessel at temperatures of from 170° to 200° C. for 20 hours. The mixture was then distilled to separate the products. It was found that 85.5 per cent of the alpha-methylstyrene had been consumed. Of the reaction products, 84.7 per cent consisted of a mixture of liquid and crystalline dimers of alpha-methylstyrene, 14 per cent was a corresponding liquid trimer, and the remainder consisted of higher polymers.

*Example 9*

A solution of one molecular equivalent of alpha-chloroisopropylbenzene and 1.68 moles of alpha-methylstyrene was passed through a glass reaction chamber where it was heated at temperatures of from 170° to 200° C. The rate of flow was such that an infinitesimal portion of the mixture was retained in the heated reaction zone for about 4 hours. The material flowing from the reaction zone was distilled to collect the products. It was found that 35.3 per cent by weight of the starting materials had been consumed. Of the reaction products, 92.7 per cent by weight was a liquid dimer of alpha-methyl styrene, 4 per cent was a corresponding liquid trimer and the remainder consisted of higher polymers.

*Example 10*

A mixture of approximately equimolecular amounts of alpha-chloroisopropylbenzene and alpha-methylstyrene was heated in an iron vessel at temperatures of from 100° to 160° C. for 16 hours, during which period hydrogen chloride was evolved. The mixture was then distilled to separate the products. It was found that 94.1 per cent by weight of the starting materials were consumed. Of the products, 84 per cent by weight was a crystalline dimer of alpha-methylstyrene, which dimer melts at 51.8° C., 10.7 per cent was a colorless viscous liquid trimer, and the remainder consisted of higher polymers.

*Example 11*

Alpha-chloroethyl-dichlorobenzene was heated under reflux in a glass vessel for 16 hours to a final temperature of 220° C. Hydrogen chloride was evolved during heating of the material. The reacted mixture was subjected to vacuum distillation for purpose of separating the lower polymeric products. It was found that about 96 per cent of the alpha-chloroethyl-dichlorobenzene had been consumed with formation of solid polymers of dichlorostyrene higher than the trimer as principal products. The dimer and trimer of dichlorostyrene were each obtained in amount corresponding to less than 7 per cent of the combined weight of the polymeric products.

In another experiment alpha-chloroethyl-dichlorobenzene was heated together with iron filings at a temperature of 190° C. for 12 hours and the resultant mixture was distilled. In this instance about 90 per cent of the alpha-chloroethyl-dichlorobenzene was consumed with formation of a liquid dimer of dichlorostyrene in amount corresponding to approximately 83 per cent of the combined weight of all of the polymeric products. The dimer distilled at 240°–250° C. at 6 millimeters absolute pressure.

*Example 12*

A mixture of 1340 pounds of alpha-methylstyrene and 160 pounds of alpha-chloroisopropylbenzene was fed at a rate of 10 gallons per hour into an iron reaction vessel of 7 gallons capacity, which vessel contained a tray of iron shavings. The mixture flowing through the vessel was heated at a temperature of about 190° C. Hydrogen chloride was vented as it was evolved from the mixture. The mixture which flowed from the vessel was distilled to separate the lower polymeric products. It was found that approximately 97 per cent of the starting materials were consumed. Of the products, 82.1 per cent by weight was a crystalline dimer of alpha-methylstyrene, 15.4 per cent was a corresponding liquid trimer, and the remainder consisted of higher polymers.

Other modes of applying the principle of the invention may be employed instead of those explained, change being made in the method herein disclosed, provided the step or steps stated by any of the following claims or the equivalent of such stated step or steps be employed.

I therefore particularly point out and distinctly claim as my invention:

1. In a method of making polymers, lower than tetramers, of alkenyl aromatic compounds having the general formula:

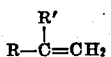

wherein R represents a monovalent aromatic radical having its valence on a nuclear carbon atom thereof and R' represents a member of the group consisting of hydrogen and alkyl radicals containing less than 4 carbon atoms, the steps of reacting, at temperatures between 100° and 250° C., an alkenyl aromatic compound containing at least 9 carbon atoms in the molecule and having said formula with an alpha-haloalkyl aromatic compound having the general formula:

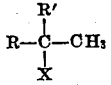

wherein R and R' have the meanings given above and X represents a halogen, whereby such polymers, lower than tetramers, are formed as the principal products, and separating the resultant polymers, lower than tetramers, from the mixture by distillation.

2. A method, as described in claim 1, wherein the alpha-haloalkyl aromatic compound is formed in situ from source-materials capable of reaction to form the same.

3. A method, as described in claim 1, wherein the alpha-haloalkyl aromatic compound contains at least 9 carbon atoms in the molecule and the alkenyl aromatic reactant is formed in situ by dehydrohalogenation of a portion of the alpha-haloalkyl aromatic compound.

4. A method, as described in claim 1, wherein the reaction is carried out at temperatures between 130° and 200° C.

5. A method, as described in claim 2, wherein the reaction is carried out at temperatures between 130° and 200° C.

6. The method which comprises heating, at a reaction temperature between 130° and 200° C., an alpha-chloroalkyl aromatic compound, having the general formula:

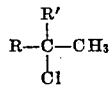

wherein R represents a monovalent aromatic radical of the benzene series having its valence on a nuclear carbon atom and R' represents a member of the group consisting of hydrogen and alkyl radicals containing less than 4 carbon atoms, together with an alkenyl aromatic hydrocarbon containing at least 9 carbon atoms in the molecule and having the general formula:

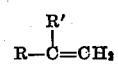

wherein R represents a monovalent aromatic radical of the benzene series having its valence on a nuclear carbon atom and R' represents a member of the group consisting of hydrogen and alkyl radicals containing less than 4 carbon atoms, whereby polymers lower than tetramers of such alkenyl aromatic compound are formed as the principal products, and separating the resultant polymers, lower than tetramers, from the mixture by distillation.

7. A method, as described in claim 6, wherein at least 0.4 molecular equivalent of the alpha-chloroalkyl aromatic compound is employed per mole of the alkenyl aromatic hydrocarbon.

8. A method, as described in claim 7, wherein the alpha-chloroalkyl aromatic compound is alpha-chloroisopropylbenzene and the alkenyl aromatic compound is alpha-methylstyrene.

9. The method which comprises heating an alkenyl aromatic hydrocarbon, containing at least 9 carbon atoms in the molecule and having the general formula:

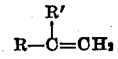

wherein R represents an aryl radical of the benzene series and R' represents a member of the group consisting of hydrogen and alkyl radicals containing less than 4 carbon atoms, together with at least 0.5 of its molecular equivalent of hydrogen chloride at reaction temperatures between 130° and 200° C., whereby polymers, lower than tetramers, of such alkenyl aromatic compounds are formed as the principal products, and distilling the resultant polymers, lower than tetramers, from the reaction mixture.

GLENN C. WIGGINS.

REFERENCES CITED

The following references are of record in the file of this patent:

UNITED STATES PATENTS

| Number | Name | Date |
|---|---|---|
| 1,870,878 | Smith | Aug. 9, 1932 |
| 2,240,583 | Sparks | May 6, 1941 |
| 2,404,538 | Schmerling | July 23, 1946 |
| 2,423,470 | Simons | July 8, 1947 |